(12) United States Patent
Yamamoto et al.

(10) Patent No.: US 8,447,076 B2
(45) Date of Patent: May 21, 2013

(54) IMAGE PROCESSING METHOD, PATTERN DETECTION METHOD, PATTERN RECOGNITION METHOD, AND IMAGE PROCESSING DEVICE

(75) Inventors: Takahisa Yamamoto, Kawasaki (JP); Yoshinori Ito, Tokyo (JP); Masao Yamanaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 795 days.

(21) Appl. No.: 12/394,593

(22) Filed: Feb. 27, 2009

(65) Prior Publication Data

US 2009/0220155 A1    Sep. 3, 2009

(30) Foreign Application Priority Data

Feb. 29, 2008  (JP) ................................. 2008-051119

(51) Int. Cl.
*G06K 9/00* (2006.01)
(52) U.S. Cl.
USPC ............................ 382/118; 382/190; 382/192
(58) Field of Classification Search
USPC ............................ 382/115–118, 188, 190, 192
See application file for complete search history.

(56) References Cited

U.S. PATENT DOCUMENTS

| | | | | |
|---|---|---|---|---|
| 5,748,776 A | * | 5/1998 | Yoshida | 382/195 |
| 5,821,915 A | * | 10/1998 | Graham et al. | 345/615 |
| 6,381,372 B1 | * | 4/2002 | Loce | 382/261 |
| 6,912,298 B1 | * | 6/2005 | Wilensky | 382/117 |
| 7,583,823 B2 | * | 9/2009 | Jones et al. | 382/117 |
| 7,616,233 B2 | * | 11/2009 | Steinberg et al. | 348/222.1 |
| 2004/0062449 A1 | * | 4/2004 | Chiu | 382/260 |
| 2005/0259886 A1 | * | 11/2005 | Shan | 382/260 |
| 2007/0065015 A1 | * | 3/2007 | Nishiyama et al. | 382/190 |

FOREIGN PATENT DOCUMENTS

| | | |
|---|---|---|
| JP | 3696212 | 9/2005 |
| JP | 2006-185375 | 7/2006 |
| JP | 3831232 | 10/2006 |
| JP | 2007-188504 A | 7/2007 |
| JP | 2007-293438 A | 11/2007 |
| JP | 2007293438 | * 11/2007 |
| JP | 2009-086926 A | 4/2009 |
| JP | 2009086926 | * 4/2009 |

OTHER PUBLICATIONS

Local Binary patterns—authentication, Heusch et al., IEEE, 0-7695-2503-2, 2006, pp. 1-6.*

(Continued)

*Primary Examiner* — Jayesh A Patel
(74) *Attorney, Agent, or Firm* — Cowan, Liebowitz & Latman, P.C.

(57) ABSTRACT

An image processing device clips a plurality of partial images from an image, and calculates difference values of pixel values between a target pixel and surrounding pixels surrounding the target pixel in the partial images. Then, the image processing device decides parameter values corresponding to respective surrounding pixels based on identification information that identifies the partial image from among the plurality of the partial images and the difference values, and calculates a feature amount corresponding to the target pixel using the parameter value decided. Then, the image processing device obtains a feature amount of the partial images by calculating the feature amount with the above-described steps, using each pixel in the partial images as the target pixels.

13 Claims, 12 Drawing Sheets

OTHER PUBLICATIONS

"Robust Object Detection and Segmentation by Peripheral Increment Sign Correlation Image", The Transactions of the Institute of Electronics, Information and Communication Engineers, D-II, vol. J 84-D-II No. 12, pp. 2585-2594, Dec. 2001, Sato et al. (Japanese document and English translation of the Abstract on the front page).

"Local Binary Patterns as an Image Preprocessing for Face Authentication," Automatic Face and Gesture Recognition, 2006. FGR 2006. 7th International Conference on Apr. 10-12, 2006, Heusch, G. et al. (English document).

Nov. 14, 2011 Japanese Office Action, that issued in Japanese Patent Application No. 2008-051119.

* cited by examiner

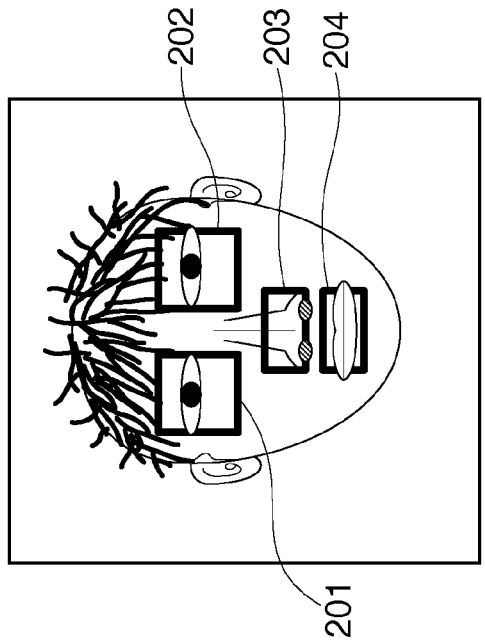
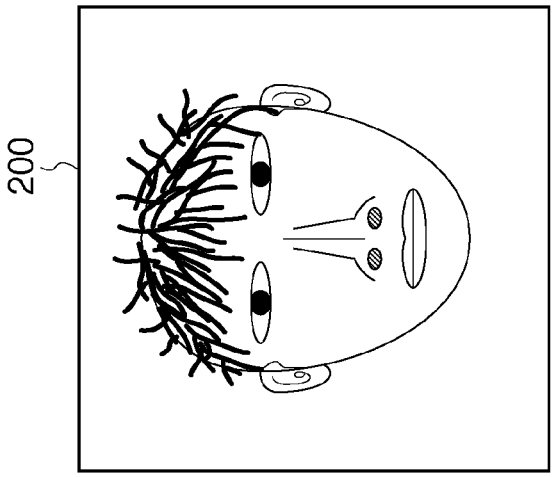

FIG. 3

| PROCESSING REGION NUMBER | HORIZONTAL DIRECTION START COORDINATE | VERTICAL DIRECTION START COORDINATE | HORIZONTAL DIRECTION WIDTH | VERTICAL DIRECTION HEIGHT |
|---|---|---|---|---|
| PROCESSING REGION 0 | HStart0 | VStart0 | Width0 | Height0 |
| PROCESSING REGION 1 | HStart1 | VStart1 | Width1 | Height1 |
| PROCESSING REGION 2 | HStart2 | VStart2 | Width2 | Height2 |
| PROCESSING REGION 3 | HStart3 | VStart3 | Width3 | Height3 |

FIG. 4

| PROCESSING REGION NUMBER | DIFFERENCE END PIXEL INDEX | QUANTIZATION VALUE | WEIGHTING PARAMETER |
|---|---|---|---|
| PROCESSING REGION 0 | 0 | 0 | W_0_0_0 |
| | | 1 | W_0_0_1 |
| | 1 | 0 | W_0_1_0 |
| | | 1 | W_0_1_1 |
| | ... | ... | ... |
| | 7 | 0 | W_0_7_0 |
| | | 1 | W_0_7_1 |
| PROCESSING REGION 1 | 0 | 0 | W_1_0_0 |
| | | 1 | W_1_0_1 |
| | ... | ... | ... |
| | 7 | 0 | W_1_7_0 |
| | | 1 | W_1_7_1 |
| PROCESSING REGION 2 | 0 | 0 | W_2_0_0 |
| | | 1 | W_2_0_1 |
| | ... | ... | ... |
| | 7 | 0 | W_2_7_0 |
| | | 1 | W_2_7_1 |
| PROCESSING REGION 3 | 0 | 0 | W_3_0_0 |
| | | 1 | W_3_0_1 |
| | ... | ... | ... |
| | 7 | 0 | W_3_7_0 |
| | | 1 | W_3_7_1 |

FIG. 5A

| 84 | 76 | 127 |
|---|---|---|
| 100 | 96 | 142 |
| 92 | 92 | 101 |

CALCULATE LUMINANCE DIFFERENCE VALUE →

FIG. 5B

| -12 | -20 | 31 |
|---|---|---|
| 4 |  | 46 |
| -4 | -4 | 5 |

QUANTIZE LUMINANCE DIFFERENCE VALUE →

FIG. 5C

| 0 | 1 | 1 |
|---|---|---|
| 1 |  | 1 |
| 0 | 0 | 0 |

SELECT WEIGHTING PARAMETER →

FIG. 5D

| W_0_7_0 | W_0_6_0 | W_0_5_1 |
|---|---|---|
| W_0_0_1 |  | W_0_4_1 |
| W_0_1_0 | W_0_2_0 | W_0_3_0 |

ADD WEIGHTING PARAMETER →

FIG. 6B

|  |  |  |
|---|---|---|
| 0 | 1 | 1 |
| 0 |   | 1 |
| 0 | 1 | 1 |

BINARY CODE : 00111001
LBP VALUE : 57

↑ MAGNITUDE COMPARISON

FIG. 6A

|  |  |  |
|---|---|---|
| 127 | 142 | 101 |
| 76 | 96 | 92 |
| 84 | 100 | 92 | i5, i4, i3, i6, i2, i7, i1, i0

FIG. 9

| ID INFORMATION | REGISTRATION IMAGE NUMBER | PROCESSING REGION NUMBER | FEATURE AMOUNT IMAGE |
|---|---|---|---|
| ID0 | 0 | PROCESSING REGION 0 | F_0_0_0 |
| | | PROCESSING REGION 1 | F_0_0_1 |
| | | PROCESSING REGION 2 | F_0_0_2 |
| | | PROCESSING REGION 3 | F_0_0_3 |
| | 1 | PROCESSING REGION 0 | F_0_1_0 |
| | | PROCESSING REGION 1 | F_0_1_1 |
| | | PROCESSING REGION 2 | F_0_1_2 |
| | | PROCESSING REGION 3 | F_0_1_3 |
| ID1 | 0 | PROCESSING REGION 0 | F_1_0_0 |
| | | PROCESSING REGION 1 | F_1_0_1 |
| | | PROCESSING REGION 2 | F_1_0_2 |
| | | PROCESSING REGION 3 | F_1_0_3 |
| | 1 | PROCESSING REGION 0 | F_1_1_0 |
| | | PROCESSING REGION 1 | F_1_1_1 |
| | | PROCESSING REGION 2 | F_1_1_2 |
| | | PROCESSING REGION 3 | F_1_1_3 |

FIG. 12A

| 7 | 6 | 5 |
|---|---|---|
| 0 |   | 4 |
| 1 | 2 | 3 |

FIG. 12B

| 3 | 2 | 1 |
|---|---|---|
|   |   | 0 |
|   |   |   |

FIG. 12C

| 15 | 14 | 13 | 12 | 11 |
|----|----|----|----|----|
| 0  | 23 | 22 | 21 | 10 |
| 1  | 16 |    | 20 | 9  |
| 2  | 17 | 18 | 19 | 8  |
| 3  | 4  | 5  | 6  | 7  |

FIG. 12D

| 15 | 14 | 13 | 12 | 11 |
|----|----|----|----|----|
| 0  |    |    |    | 10 |
| 1  |    |    |    | 9  |
| 2  |    |    |    | 8  |
| 3  | 4  | 5  | 6  | 7  |

IMAGE PROCESSING METHOD, PATTERN DETECTION METHOD, PATTERN RECOGNITION METHOD, AND IMAGE PROCESSING DEVICE

BACKGROUND OF THE INVENTION

1. Field of the Invention

The present invention relates to pattern reference in the field of image processing techniques, and particularly relates to a technique for extracting a feature amount of a detection target pattern/recognition target pattern from an image in order to improve accuracy in pattern reference.

2. Description of the Related Art

Recently, a practical method has been proposed in a method for detecting a target pattern from an image through image processing. Particularly, various applications can be thought of when the target pattern is a human face, and therefore extensive research and development have been conducted for such a detection method. Furthermore, in addition to face detection itself, extensive research and development have also been conducted regarding a method of face recognition which identifies whose face the detected face belongs to among persons registered in advance.

A matching method is a technique frequently used in such a detection/recognition method. In the matching method, a degree of similarity is calculated by identification processing such as normalized correlation and the like executed between templates (registration images) provided in advance and a processing target image.

When applying face detection/face recognition using such a matching method in a real environment, such as a security system, there is the possibility that the contrast of image changes, or partial shades are generated in the image, due to changes in the weather and the time of day. In a real environment, appearances (patterns) in images change significantly according to such changes in light conditions, greatly affecting the detection accuracy/recognition accuracy.

To reduce such a problem, it has been proposed that a feature amount that is robust with respect to the changes in light is extracted from the luminance value, and the identification processing is executed on the feature amount, rather than executing the identification processing on the luminance value itself of the image. For example, a method in which correlation processing is executed on signs (Peripheral Increment Signs) of the luminance difference between a target pixel and surrounding pixels is discussed in Japanese Patent No. 3831232 (referred to as "Patent Document 1" hereinafter) and Sato, Kaneko, and Igarashi's "Robust Object Detection and Segmentation by Peripheral Increment Sign Correlation Image", The Transactions of the Institute of Electronics, Information and Communication Engineers, D-II, Vol. J 84-D-II No. 12, pp. 2585-2594, December 2001 (referred to as "Non-Patent Document 1" hereinafter). In the method discussed in these documents, increments (magnitudes) in the gray value between the target pixel and the surrounding pixels in a template image and in a processing target image are expressed as signs, and the number of the matching signs are regarded as similarities. It is known that reference that is robust against brightness changes or the presence of noise in a range that does not reverse the signs can be executed using such a method.

However, the techniques discussed in Patent Document 1 and Non-Patent Document 1 calculate similarities between the template image and the processing target image. Therefore, when the detection target is broadened to, for example, a face, that is, an area that falls into a single category but that is individually characteristic, templates have to be prepared for each face type, making it difficult to put the techniques into practical usage.

Japanese Patent No. 3696212 (referred to as "Patent Document 2" hereinafter) and Japanese Patent Laid-Open No. 2006-185375 (referred to as "Patent Document 3" hereinafter) attempt to solve such a problem by extracting statistical characteristics of the peripheral increment signs from a database of detection target images (for example, various face images).

As another feature extraction similar to the peripheral increment sign technique, the LBP (Local Binary Pattern) operator is known, and a method using this LBP operator as preprocessing for removing the effects of changes in light on face recognition has been proposed as well (G. Heusch, Y. Rodriguez, and S. Marcel's "Local binary patterns as an image preprocessing for face authentication," Automatic Face and Gesture Recognition, 2006. FGR 2006. 7th "International Conference on 10-12 Apr. 2006" (referred to as "Non-Patent Document 2" hereinafter)). The LBP operator for the pixel at position $(x_c, y_c)$ is defined as the following formula. In the formula, "$i_c$" represents the luminance value of the pixel at position $(x_c, y_c)$, and "$i_n$" represents the luminance value of eight surrounding pixels. "n" represents an index of the surrounding pixels, where the index of the pixel in the upper left position to the position $(x_c, y_c)$ is set to n=7, and the index decreases by one in the clockwise direction therefrom.

$$LBP(x_c, y_c) = \sum_{n=0}^{7} s(i_n - i_c) 2^n \qquad \text{[Formula 1]}$$

$$s(x) = \begin{cases} 1 & \text{if } x \geq 0 \\ 0 & \text{if } x < 0 \end{cases}$$

When the calculation target pixel ($i_c$=96) at center position $(x_c, y_c)$ and eight surrounding pixels are disposed as shown in FIG. 6A, 1 or 0 is assigned thereto based on their magnitude relations. FIG. 6B shows the result of the assignment. These assigned numbers of 1 or 0 are called quantization values, in the sense that binary quantization is executed on the difference values. Furthermore, the LBP value is obtained by adding a weight of a power of two to these quantization values. In Non-Patent Document 2, face recognition processing is executed for an image made up of the LBP values thus obtained.

However, problems such as those described below arise in Patent Document 2 and Patent Document 3, which execute face detection using the peripheral increment signs, and in Non-Patent Document 2, which executes face recognition using the LBP.

In Non-Patent Document 2, a weight of a power of two is assigned to the quantization values according to the relative positions of the calculation target pixel and surrounding eight pixels. To be specific, a weight of 128 is assigned to the pixel in the upper left relative to the calculation target pixel, and a weight of 64 is given to the pixel directly above the calculation target pixel, and subsequently, weights of 32, 16, 8, 4, 2, and 1 are assigned in the clockwise direction.

However, such a weight assignment of a power of two in the clockwise direction from the upper left pixel is not necessarily reasonable. For example, when a user wants to detect a pattern with many edges extending in the horizontal direction (horizontal stripes and the like) as the detection target, it can be expected that the detection performance improves when a greater weight is assigned in a direction that embodies the characteristics of the detection target. Additionally, the value for the weighting does not necessary has to be a power of two.

Furthermore, there is a case when a user wants to detect a pattern including many edges extending in the horizontal direction in a certain area (for example, around the eyes) and many edges extending in the vertical direction in another area (for example, around the nose) in an image such as a face as the detection target. In such a case, improvement in detection performance can be expected when the weighting on the directions is changed on a regional basis.

However, in Non-Patent Document 2, no consideration is given to such changing of weighting according to the characteristics of the detection target as described above, and further to changing of weighting according to partial regions of the detection target.

Furthermore, in Patent Document 2, an attempt has been made to capture the characteristics of the detection target by measuring the probability of occurrence of the increment signs, for each direction of the increment signs, and for the quantization values, using a database made up of detection target images. Furthermore, in Patent Document 3, an attempt has been made to capture the characteristics of the detection target by vectorizing the peripheral increment signs, for each direction of the increment signs, and for the quantization value, using a database made up of the images of the detection target images; and measuring the probability of occurrence for each vector.

However, when detecting a target pattern with the methods in Patent Document 2 or Patent Document 3, it is necessary to hold the probabilities of occurrence measured using the database as a table. Therefore, there is a problem in that particularly when the detection processing is executed using hardware, the amount of memory required to realize the table increases.

Particularly, when applying the method in Patent Document 2 or Patent Document 3 to a face recognition method in which a person is identified by his/her face out of persons registered in advance, there is a problem in that the number of tables increases in proportion with the number of persons registered. Furthermore, there is a problem in that sufficient images (images including the registered person) for calculating the reliable probability of occurrence are necessary for respective registered persons.

SUMMARY OF THE INVENTION

According to one aspect of the present invention, in a process for detecting a detection target in an image, a feature amount is obtained, which provides improved detection performance as well as a smaller required amount of memory.

According to one aspect of the present invention, there is provided an image processing method comprising: a clipping step of clipping a plurality of partial images from an image based on a predetermined criterion, a first calculating step of calculating difference values of pixel values between a target pixel and surrounding pixels surrounding the target pixel in the partial image clipped in the clipping step, a deciding step of deciding parameter values for each of the surrounding pixels based on identification information that identifies the partial image from among the plurality of the partial images clipped in the clipping step and the difference values, a second calculating step of calculating a feature amount corresponding to the target pixel using the parameter values decided in the deciding step, and an obtaining step of obtaining feature amounts for each of the partial images by calculating the feature amount in the first calculating step, the deciding step, and the second calculating step, using each pixel in the partial images as the target pixels.

Also, according to another aspect of the present invention, there is provided an image processing method comprising: a clipping step of clipping a partial image from an image, a first calculating step of calculating difference values of pixel values between a target pixel and surrounding pixels surrounding the target pixel in the partial image, a deciding step of deciding parameter values for each of the surrounding pixels based on types of features to be detected and the difference values, a second calculating step of calculating a feature amount corresponding to the target pixel using the parameter values decided in the deciding step, and an obtaining step of obtaining a feature amount of the partial image by calculating the feature amount in the first calculating step, the deciding step, and the second calculating step, using each pixel in the partial image as the target pixels.

Also, according to another aspect of the present invention, there is provided an image processing device comprising: a clipping unit that clips a plurality of partial images from an image based on a predetermined criterion, a first calculating unit that calculates difference values of pixel values between a target pixel and surrounding pixels surrounding the target pixel in the partial image clipped by the clipping means, a deciding unit that decides parameter values for each of the surrounding pixels based on identification information that identifies the partial image from among the plurality of the partial images clipped by the clipping means and the difference values, a second calculating unit that calculates a feature amount corresponding to the target pixel using the parameter values decided by the deciding means, and an obtaining unit that obtains feature amounts for each of the partial images by calculating the feature amount by the first calculating means, the deciding means, and the second calculating means, using each pixel in the partial images as the target pixels.

Furthermore, according to another aspect of the present invention, there is provided an image processing device comprising: a clipping unit that clips a partial image from an image, a first calculating unit that calculates difference values of pixel values between a target pixel and surrounding pixels surrounding the target pixel in the partial image, a deciding unit that decides parameter values for each of the surrounding pixels based on types of features to be detected and the difference values, a second calculating unit that calculates a feature amount corresponding to the target pixel using the parameter values decided by the deciding means, and an obtaining unit that obtains a feature amount of the partial image by calculating the feature amount by the first calculating means, the deciding means, and the second calculating means, using each pixel in the partial image as the target pixels.

Further features of the present invention will become apparent from the following description of exemplary embodiments with reference to the attached drawings.

BRIEF DESCRIPTION OF THE DRAWINGS

FIGS. 2A and 2B are diagrams illustrating a clipped normalized image and a processing region.

FIG. 3 is a diagram illustrating processing region identifying information.

FIG. 4 is a diagram illustrating a storage state of weighting parameters in a weighting parameter storage unit.

FIGS. 5A to 5D are diagrams schematically illustrating processing performed by a feature amount extraction unit.

FIGS. 6A and 6B are diagrams schematically illustrating processing for calculating an LBP value.

FIG. 9 is a diagram illustrating a storage state of feature amount images in the registered feature amount image storage unit.

FIGS. 12A to 12D are diagrams illustrating difference end pixels in a processing window.

DESCRIPTION OF THE EMBODIMENTS

Exemplary embodiments of the present invention will now be described in detail in accordance with the accompanying drawings.

First Embodiment

A recognition system using an image processing method according to a first embodiment is described hereinafter.

"Recognition" refers to processing in which, when recognition targets can be categorized into several concepts (classes), an observed recognition target is made to correspond with one of these concepts. For example, "face recognition" refers to an image processing method in which a face image present in an inputted image is identified as a person registered in advance.

In the example shown in the first embodiment, the image processing method of the present invention is applied to pattern recognition in which a determination is made as to which pattern registered in advance an image corresponds to based on the feature amount of the image in the processing region. Particularly, the example shown illustrates a case where an image processing method of the present invention is applied, as a pattern recognition application, to face recognition. It is assumed that face detection processing (detection of the position, size, orientation of the face in the image) that is necessary prior to the face recognition processing has been already executed using a known detection method. The "orientation" of the face in the first embodiment refers to in-plane rotation.

In the first embodiment, an image processing method of the present invention is applied to an image clipped out surrounding the face according to the face position, face size, and face orientation detected in the face detection, and further normalized to a predetermined face size and a predetermined face orientation. Therefore, it is assumed that in the image (image clipped and normalized by face detection) to which the image processing method according to the first embodiment is applied, the eyes, nose, mouth, and the like share approximately common positions.

Furthermore, to simplify the descriptions, all the images handled in this embodiment are assumed to be grayscale images (luminance images).

Figure 1:
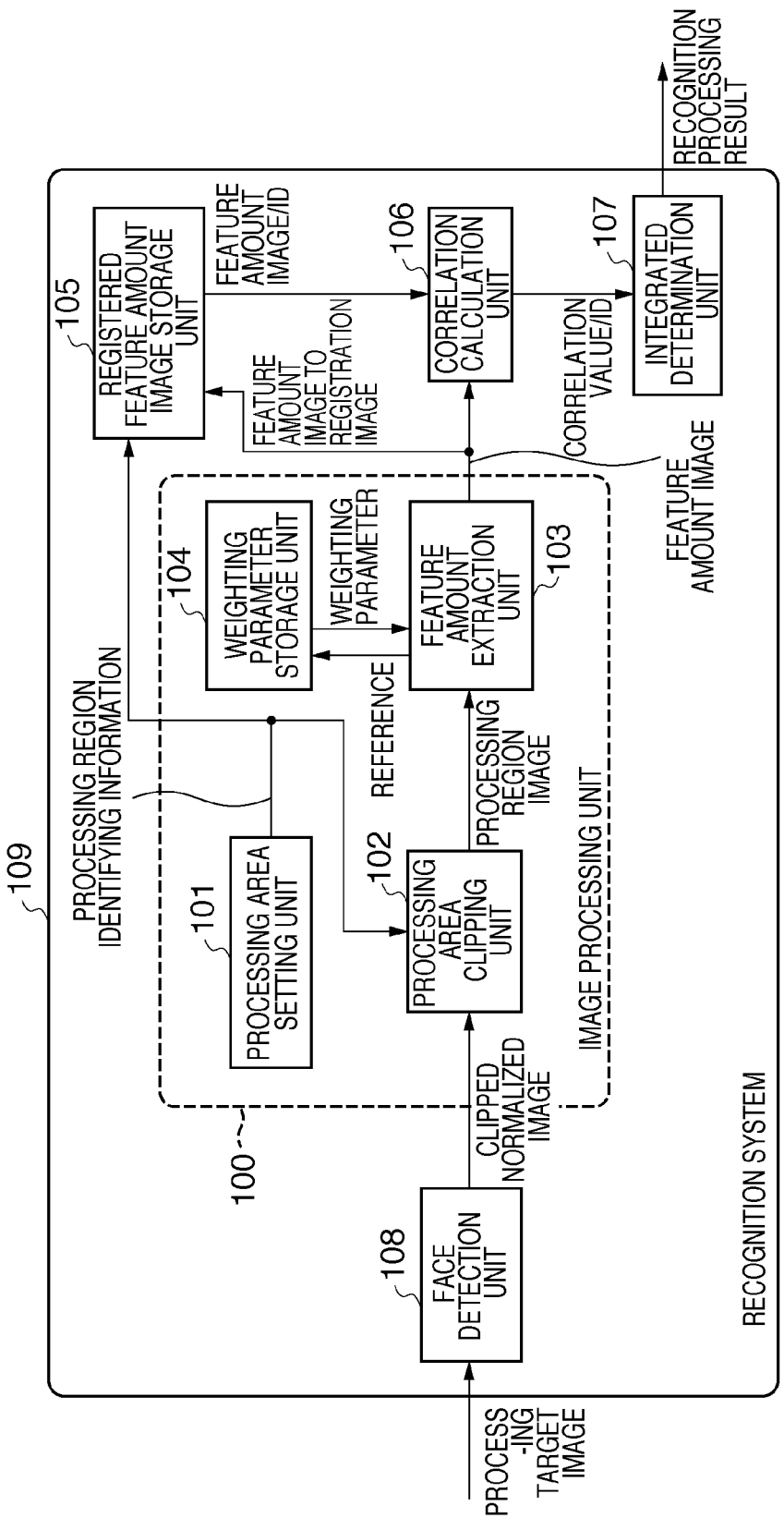
FIG. 1 is a block diagram illustrating a preferred embodiment of a recognition system of the present invention.

FIG. 1 is a block diagram illustrating an exemplary configuration of a face recognition system according to the first embodiment.

A recognition system 109 executes face recognition. The recognition system 109 is inputted with a processing target image, and outputs the recognition processing result. When the recognition system 109 determines that the processing target image includes any of the persons registered in advance, the recognition system 109 outputs information identifying that person as the recognition processing result. When the recognition system 109 determines that the processing target image does not include any person registered in advance, the recognition system 109 outputs this determination as the recognition processing result.

Operation modes of the recognition system 109 include a registration mode and a recognition mode. When in the registration mode, the recognition system 109 is inputted with a registration image (image including the person to be recognized) as a processing target image, and stores a feature amount image obtained from the registration image in a registered feature amount image storage unit 105. When in the recognition mode, a test image (image that a user wants to check whether or not the recognition target person is included) is inputted as the processing target image, and the feature amount image stored in the registered feature amount image storage unit 105 while in the registration mode is compared with the feature amount image of the test image. Details of the processing performed in each mode are to be described later.

A face detection unit 108 executes a known face detection method on the inputted processing target image, and identifies the position, size, and direction of the face in the processing target image (in the following, referred to as the face position, face size, and face direction). Furthermore, the face detection unit 108 normalizes the face size to a predetermined size based on the identified face position, face size, and face direction; creates a clipped normalized image by clipping the face image so that the face is oriented in a predetermined direction; and outputs the clipped normalized image. FIG. 2A shows an example of the clipped normalized image. Reference numeral 200 illustrates the clipped normalized image.

An image processing unit 100 executes image processing according to the first embodiment. The image processing unit 100 sets a plurality of processing regions to the clipped normalized image from the face detection unit 108; executes feature amount extraction processing for respective processing regions; and outputs feature amount images. Details of such processes are to be mentioned later.

A processing area setting unit 101 sets a processing region in the clipped normalized image using a predetermined method, and outputs the information identifying the processing region that has been set (referred to as "processing region identifying information").

The predetermined method for setting the processing region is not particularly limited, and a known technique may be used. In this embodiment, because the positions of the eyes, nose, and mouth in the clipped normalized image are approximately common as described above, a fixed processing region that is irrelevant to the content of the clipped normalized image may be used. In this embodiment, four regions are set as the processing region. FIG. 2B shows an example of the processing region according to this embodiment. 201, 202, 203, and 204 (shown in bold lines) are shown as the processing region in the clipped normalized image 200. Although the processing regions do not overlap each other in the example of FIG. 2B, the processing regions may overlap with each other.

An example of the processing region identifying information, in the case where the processing regions are set as in FIG. 2B, is shown in FIG. 3. The processing region identifying information is configured of a processing region number, that is, the index of processing regions, a horizontal direction start coordinate, a vertical direction start coordinate, a horizontal direction width, and a vertical direction height, and the processing region is identified based on such information. In this embodiment, it is assumed, for example, processing region 0 corresponds to the processing region 201, processing region 1 corresponds to the processing region 202, processing region 2 corresponds to the processing region 203, and processing region 3 corresponds to the processing region 204. The processing region identifying information does not necessarily have to be as shown in FIG. 3, as long as the processing region can be identified uniquely from the information. The shape of the processing region is not limited to a quadrangle, and may be a circle, an oval, or a polygon with any number of corners.

The processing area setting unit 101 sequentially outputs respective processing region information (referred to as "processing region identifying information" hereinafter).

A processing area clipping unit 102 executes processing to clip a predetermined processing region from the inputted clipped normalized image according to the processing region identifying information outputted from the processing area setting unit 101. For example, when processing region identifying information relating to processing region 0 is outputted from the processing area setting unit 101, the processing area clipping unit 102 clips the processing region 201 and outputs the processing region 201 as a processing region image. Thus, a plurality of processing region images (partial images) are clipped from the processing target image (or normalized image) with a predetermined criterion by the processing area setting unit 101 and the processing area clipping unit 102.

A weighting parameter storage unit 104 outputs weighting parameters to a feature amount extraction unit 103 according to the conditions identified by the feature amount extraction unit 103. The weighting parameters can be set according to the processing region number, the quantization level of quantization processing in the feature amount extraction unit 103, and a difference end pixel index (described later). The weighting parameters stored in the weighting parameter storage unit 104 are shown in FIG. 4. FIG. 4 shows weighting parameters in the case where there are four processing regions as shown in FIG. 2B, the quantization level of quantization processing in the feature amount extraction unit 103 is two (to be quantized into 0 and 1), and there are eight difference end pixels to be described later. The processing region number is identification information that identifies which of the plurality of processing region images clipped by the processing area clipping unit 102 a particular region image is.

The feature amount extraction by the feature amount extraction unit 103 shall be described hereinafter.

Figure 7:
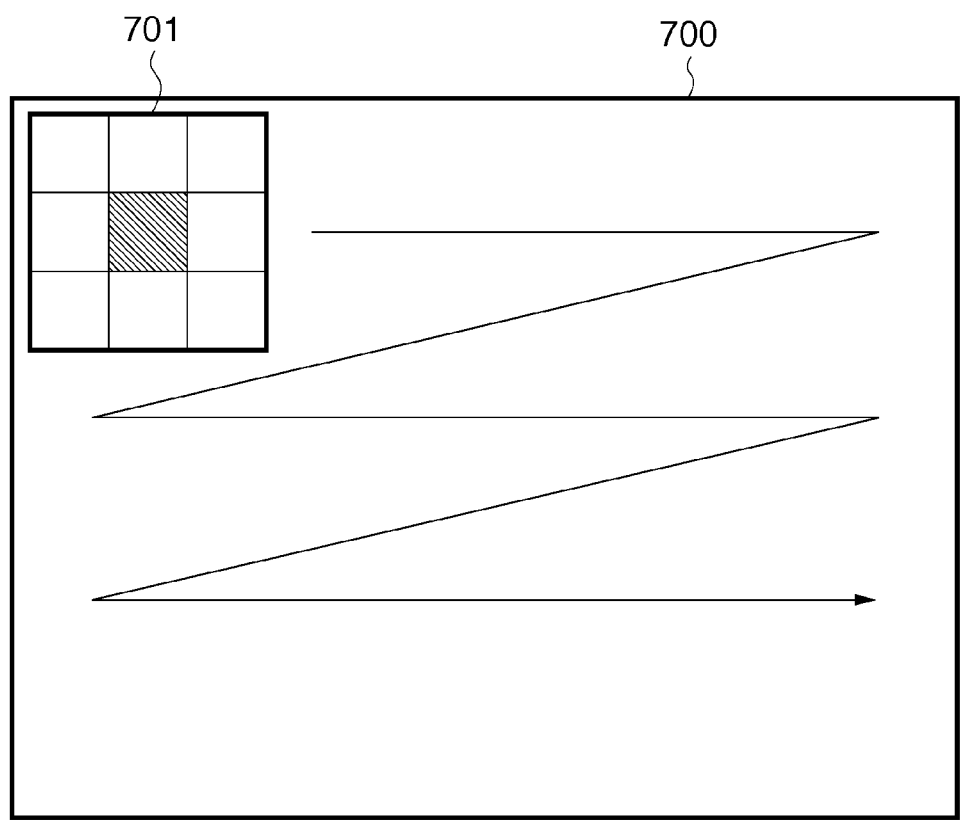
FIG. 7 is a diagram illustrating a manner in which a processing region is scanned with a processing window.

It is assumed that information relating to processing region 0 is outputted from the processing area setting unit 101. At this time, an image of the processing region 201 is outputted from the processing area clipping unit 102. FIG. 7 shows an enlarged processing region for illustrating the procedures of feature amount extraction. Reference numeral 700 represents a processing region (for example, the processing region 201) that is enlarged. Reference numeral 701 represents a processing window with a size of three pixels by three pixels. The feature amount extraction unit 103 scans the processing region with the processing window 701, and calculates the feature amount of the center pixel (hatched portion in FIG. 7) of the processing window 701 at every scanning position. In this embodiment, the scanning step is executed by one pixel, in the horizontal direction and in the vertical direction.

FIGS. 5A to 5D show procedures of feature amount extraction when the processing window 701 is at a scanning position. In FIGS. 5A to 5D, the bold frame shows the processing window. FIG. 5A shows luminance values of a pixel in the processing window 701 at a scanning position. In each scanning position, the pixel at the center of the processing window is called a difference origin pixel, and surrounding pixels are called difference end pixels. A plurality of difference end pixels are present (eight pixels in the case of FIGS. 5A to 5D). That is, the difference origin pixel is the target pixel for calculating the feature amount, and the difference end pixels are a plurality of surrounding pixels present surrounding the target pixel. In order to differentiate respective difference end pixels, the difference end pixel is given an index, setting the pixel at upper left with respect to the center pixel as seven, and decreasing in the clockwise direction by one from the upper left pixel from the center pixel. In the case of the processing window shown in FIG. 5A, the luminance value of the difference origin pixel is 96, and the luminance value of the difference end pixel with index of seven is 84. The index (index value) shows relative position relationship of the difference end pixel relative to the difference origin pixel.

Figure 8:
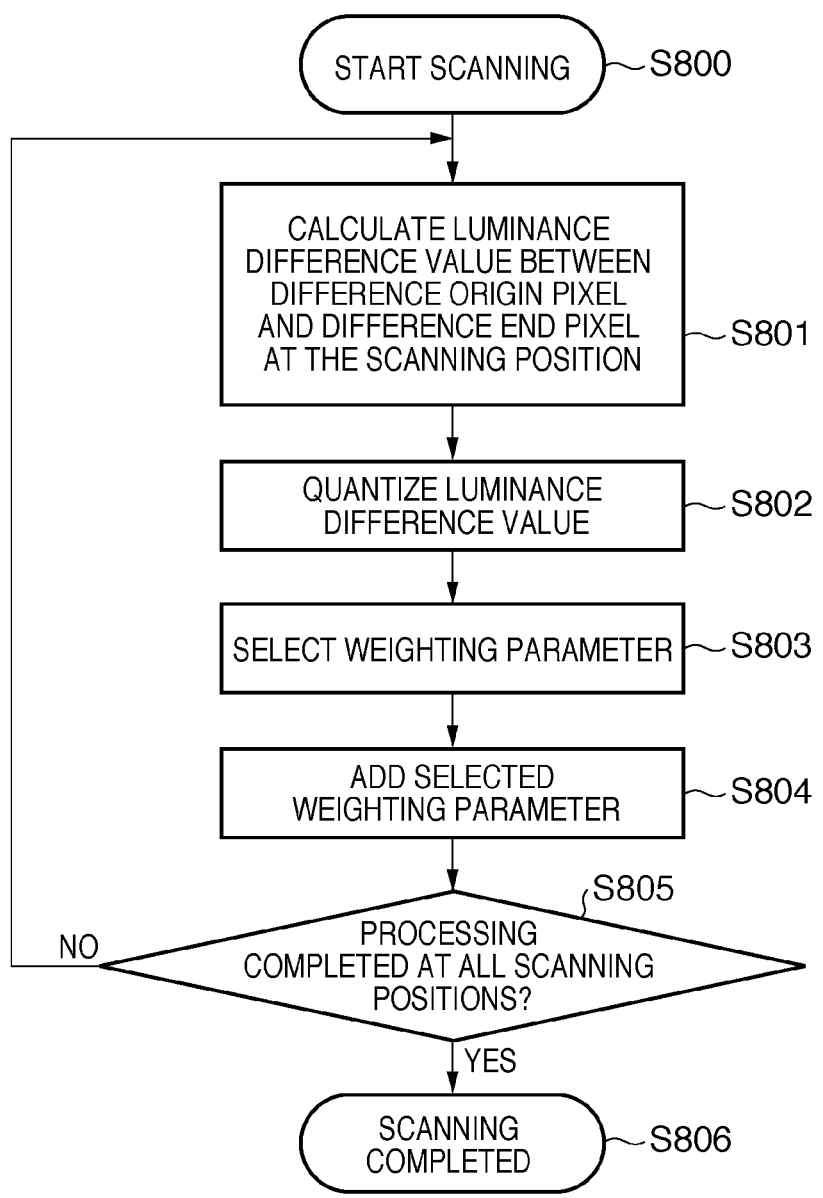
FIG. 8 is a flowchart illustrating a flow of processing performed by the feature amount extraction unit.

FIG. 8 shows a flowchart of processing performed by the feature amount extraction unit 103.

Scanning is started with the processing window 701 in the processing region 700 (step S800).

When the window 701 is shifted to a new scanning position, the feature amount extraction unit 103 compares magnitudes between the difference origin pixel and the difference end pixel at that scanning position. First, the luminance difference value is obtained from the difference origin pixel and the difference end pixel at that scanning position. Because the luminance difference value is calculated for each difference end pixel, the number of luminance difference values calculated equals the number of the difference end pixels (step S801). FIG. 5B shows the result of the first calculation processing in step S801 of the processing window shown in FIG. 5A.

Then, the feature amount extraction unit 103 executes quantization on the luminance difference value. In this embodiment, the quantization level of the quantization processing is set to two; and the luminance difference value is quantized to 1 when the luminance difference value is 0 or more, and the luminance difference value is quantized to 0 when the luminance difference value is below 0 (step S802). FIG. 5C shows the result of performing the processing of step S802 on the processing window shown in FIG. 5B.

Then, the feature amount extraction unit 103 obtains weighting parameters for the respective quantization values obtained in step S802 from the weighting parameter storage unit 104 (step S803). That is, in step S803, weighting parameters are selected for the calculated quantization values. As described in FIG. 4, weighting parameters are stored in the weighting parameter storage unit 104 in correspondence with the combination of the processing region number, the difference end pixel index, and the quantization value. Therefore, by outputting the processing region number, the difference end pixel index, and the quantization value to the weighting parameter storage unit 104, the feature amount extraction unit 103 obtains the weighting parameters suitable to these conditions from the weighting parameter storage unit 104. Thus, weighting parameters are selected for each of the difference end pixels, setting one pixel as the difference origin pixel. That is, the feature amount extraction unit 103 determines parameter values for each of the luminance difference values by referring to the weighting parameter storage unit 104, based on identification information (a processing region number) that identifies which of the plurality of the processing region images the processing region image is, the luminance difference value (quantization value is used in this example), and the relative position relationship (index) of the difference end pixel of which the luminance difference value is calculated to the difference origin pixel.

For example, when quantized as shown in FIG. 5C (processing region 0), the weighting parameter selected for quantization value (0) with difference end pixel index of seven is, as shown in FIG. 5D, W_0_7_0.

Next, the feature amount extraction unit 103 executes a second calculation processing, in which a feature amount corresponding to the difference origin pixel (target pixel) is calculated using the parameter value determined in step S803. In this embodiment, the feature amount extraction unit 103 adds the selected weighting parameter, and regards that value as the feature amount at the scanning position (step S804).

If the processing in above-described steps S801 to S804 is executed at all the scanning positions (step S805), the scanning is terminated, and the processing of the feature amount extraction unit 103 to that processing region is terminated (step S806).

The feature amount extraction unit 103 executes the above processing on respective processing regions.

When the processing performed by the feature amount extraction unit 103 on one processing region is completed, a feature amount image having the extracted feature amount as the pixel value is created. However, because the size of the processing window 701 is three by three, the size of the feature amount image is smaller by two pixels compared with the processing region, both in the horizontal direction and in the vertical direction. Because the feature amount image is created for each processing region, when one processing target image is inputted in the recognition system 109, the feature amount images of the number equal to the number of the processing regions are created. For example, because there are four processing regions in FIG. 2B, four feature amount images are created.

Thus, the image processing unit 100 is configured of the processing area setting unit 101, the processing area clipping unit 102, the feature amount extraction unit 103, and the weighting parameter storage unit 104.

The feature amount image corresponding to the registration image is stored in a registered feature amount image storage unit 105. The registration image refers to an image including the person to be recognized.

When the recognition system 109 is in the registration mode, the face detection unit 108 executes face detection processing and the image processing unit 100 executes feature amount extraction processing on the registration image, and a feature amount image is outputted for each processing region. The feature amount image for the registration image is stored in the registered feature amount image storage unit 105. ID information (name and the like) that identifies the person who is in the registration image is also stored in association with the feature amount image. Because the feature amount image of a number equivalent to the number of the processing regions is stored per one registration image, the feature amount image is associated with the source processing region number and ID information.

FIG. 9 shows an example of the feature amount image stored in the registered feature amount image storage unit 105. FIG. 9 shows a case with two registration persons (persons to be recognized), represented by ID 0 and ID 1. Also, in the case shown, two registration images are used for respective registration persons to create and store a feature amount image.

When the recognition system 109 is in the recognition mode, the stored feature amount image and the ID information of the feature amount image are outputted based on the processing region identifying information outputted from the processing area setting unit 101. For example, when information relating to processing region 0 is outputted from the processing area setting unit 101, the registered feature amount image storage unit 105 outputs the feature amount image created from processing region 0 and its ID information in order. For example, when the registered feature amount image storage unit 105 stores a feature amount image as shown in FIG. 9, F_0_0_0, F_0_1_0, F_1_0_0, and F_1_1_0 are outputted in order as feature amount images. Also, ID 0, ID 0, ID 1, and ID 1 are outputted as their ID information.

In FIG. 1, a correlation calculation unit 106 executes correlation calculation for the feature amount image of the registration image and the feature amount image of the test image for respective processing regions. The type of the correlation calculation is not particularly limited, and a known technique can be used. In this embodiment, as an example, normalized correlation calculation is executed.

For example, when feature amount images are stored in the registered feature amount image storage unit 105 as shown in FIG. 9, first, in the correlation calculation unit 106, normalized correlation calculation of the feature amount image calculated from processing region 0 of the test image and F_0_0_0 is executed, and a correlation value is calculated. Next, normalized correlation calculation with F_0_1_0 is executed, and a correlation value is calculated. Similarly, normalized correlation calculation with F_1_0_0 and F_1_1_0 is executed, and their correlation values are calculated. Next, normalized correlation calculation is executed for the feature amount image calculated from processing region 1 of the test image and F_0_0_1, F_0_1_1, F_1_0_1, and F_1_1_1, and their respective correlation values are calculated. The processing is executed in the same manner for all the processing regions.

The correlation calculation unit 106 outputs the calculated correlation values along with the ID information associated with the feature amount image of the registration image used for the correlation value calculation. The number of the correlation values calculated in the correlation calculation unit 106 equals the number of the feature amount images stored in the registered feature amount image storage unit 105 (16 in the case of FIG. 9).

An integrated determination unit 107 determines which person, out of the persons registered in advance, is included in the test image based on the correlation value and ID information sent from the correlation calculation unit 106. Or, the integrated determination unit 107 determines that none of the persons registered in advance are included in the test image.

The determination method is not particularly limited, and a known method can be used. For example, the integrated determination unit 107 in this embodiment calculates an average of the correlation value (correlation value average) based on a unit of ID information, and the maximum among the correlation value averages (maximum correlation value average) is obtained. Then, when the maximum correlation value average exceeds the predetermined threshold, the integrated determination unit 107 determines that the person with the ID information associated with the maximum correlation value average is included in the test image. When the maximum correlation value average does not exceed the predetermined threshold, the integrated determination unit 107 determines that none of the persons registered are included in the test image.

The above is the description of the face recognition system (FIG. 1) according to the first embodiment.

According to the face recognition system of the first embodiment, the weighting parameters can be set according to the direction at the time of obtaining the luminance difference value (relative position relationship between the difference origin pixel and the difference end pixel) in the feature amount extraction unit 103. Therefore, adjustment such as setting a larger weight to the direction that is important for recognition processing (direction that tends to be obvious among individuals) is possible, improving recognition performance. Furthermore, settings of the weighting parameter can be changed for each processing region. Therefore, for example, the weighting in the vertical direction can be set larger for a processing region around the eyes (the region 201 and the region 202 in FIG. 2B), and weighting in the horizontal direction can be set larger for a processing region around the nose (the region 203 in FIG. 2B). It is highly possible that the important direction for recognition processing differs by processing regions, and therefore recognition performance is expected to improve due to such adjustability as well.

Furthermore, according to the first embodiment, the number of the weighting parameters stored in the weighting parameter storage unit 104 is obtained by multiplying the number of the processing regions, the number of the difference end pixel indexes, and the number of the quantization levels. Therefore, the weighting parameter storage unit 104 can be realized with a relatively small amount of memory capacity.

The method for determining the weighting parameter value may be, for example, a method in which a person makes a determination based on experience. Or, the method may be such that the set of weighting parameters with the best recognition performance is determined by preparing the database for learning configured of registration images and test images, and checking recognition performance by applying various sets of weighting parameters.

Or, the method may be such that the set of weighting parameters with the largest value is determined by calculating a correct response correlation value and an error response correlation value for various sets of weighting parameters for similar database, and deducting the error response correlation value from the correct response correlation value. The correct response correlation value is a correlation value when the registration image matches the ID of the test image, and the error response correlation value is a correlation value when the registration image and the ID of the test image do not match.

Although the recognition system according to the first embodiment included the registration mode and the recognition mode, the registration mode is not absolutely necessary. The processing equivalent to the processing on the registration image executed in the registration mode can be executed in advance off-line to calculate the feature amount image, and the feature amount image may be stored in the registered feature amount image storage unit 105.

Second Embodiment

Next, a detection system using the image processing method according to the second embodiment is described.

In the example shown in the first embodiment, the present invention is applied to recognition processing (face recognition). In the example of the second embodiment, the present invention is applied to pattern detection in which a detection target pattern is detected from an image based on the obtained feature amount of the processing region image. Particularly, the present invention is applied to a case, as pattern detection application, of "eyes (human eyes)" detection. That is, in the example shown, the present invention is applied to a detection of eyes included in the inputted image.

To simplify the descriptions, all the images handled in the second embodiment are also assumed to be grayscale images (luminance images).

Figure 10:
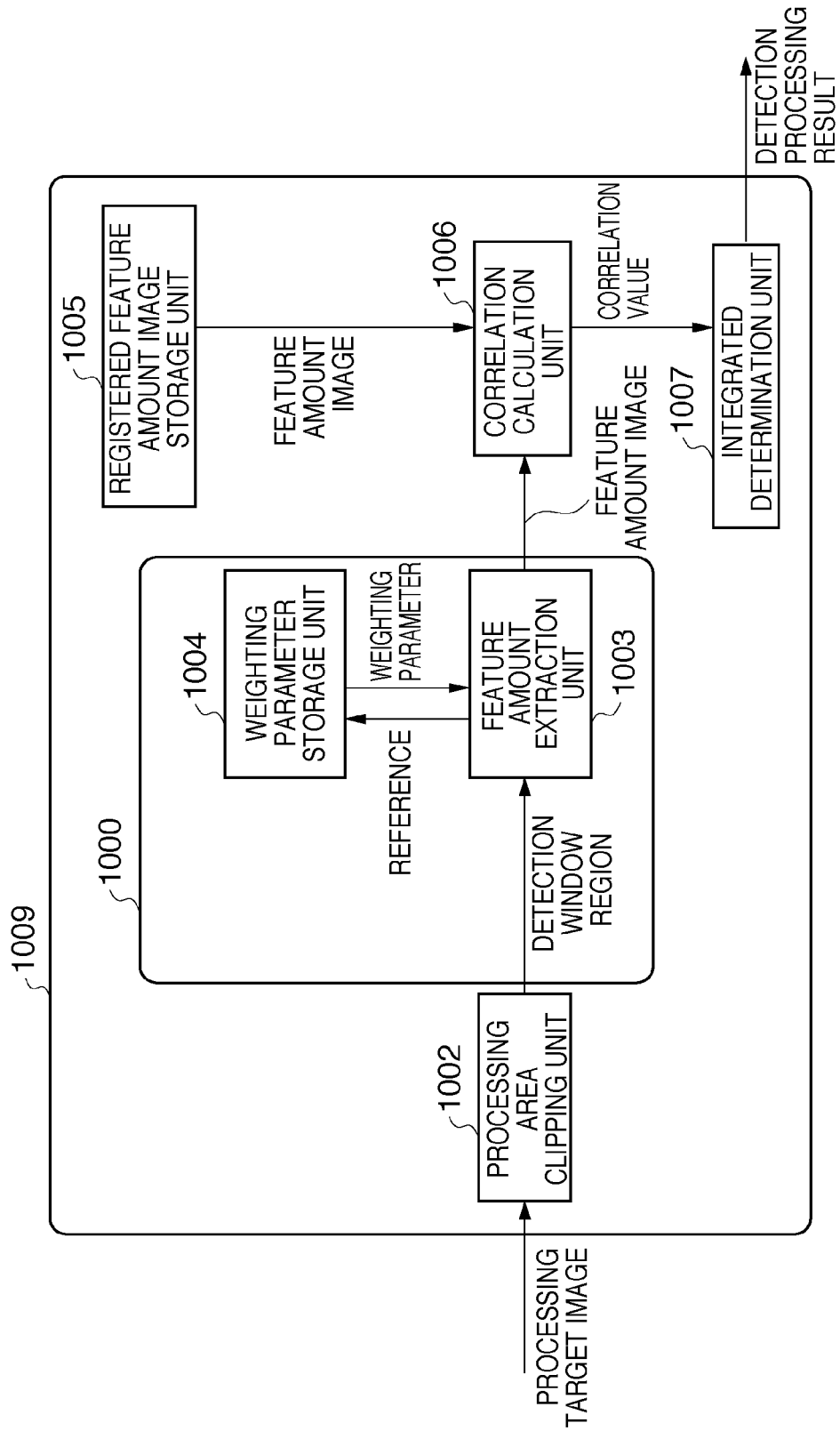
FIG. 10 is a block diagram illustrating a preferred embodiment of a detection system of the present invention.

FIG. 10 is a block diagram illustrating an eye detection system according to the second embodiment.

An eye detection system 1009 inputs a processing target image and outputs the detection processing result. When it is determined that eyes are included in the processing target image, information identifying the position is outputted as the detection processing result. When it is determined that the eyes are not included in the processing target image, the result indicating such is outputted.

A processing area clipping unit 1002 executes processing to scan a processing target image with a detection window of a predetermined size, and clips the image in the detection window at the scanning position. The region clipped with a size of the detection window is called a detection window region.

An image processing unit 1000 executes image processing according to the second embodiment. The image processing unit 1000 executes feature amount extraction processing on a detection window region clipped by the processing area clipping unit 1002, and outputs the feature amount image. Details of the processes are to be described later.

A weighting parameter storage unit 1004 outputs weighting parameters to the feature amount extraction unit 1003 according to the conditions identified by the feature amount extraction unit 1003. The weighting parameters can be set according to the quantization level of quantization in the feature amount extraction unit 1003, and a difference end pixel index. Therefore, for example, when the quantization level of quantization in the feature amount extraction unit 1003 is two (to be quantized into 0 and 1), and there are eight difference end pixels, there are 16 weighting parameters. Although the weighting parameters in the weighting parameter storage unit 1004 are approximately the same as in the first embodiment (FIG. 4), the weighting parameters are stored for respective detection targets, such as eyes, nose, and mouth, not for respective processing regions.

The processes for the feature amount extraction by the feature amount extraction unit 1003 are the same as the case in the first embodiment, and therefore details are omitted. However, although the target of the feature amount extraction is sequentially scanned a plurality of times with the processing window in the processing region in the case of the first embodiment, the second embodiment is different in that the detection window region is the target of scanning for one time; the processing content, however, is the same. Furthermore, the feature amount extraction unit 1003 determines parameter values for respective luminance difference values by referring to the weighting parameter storage unit 1004, based on

- types of features to be detected (eyes, mouth, nose, and the like),
- the luminance difference value (quantization value is used in this example), and
- the relative position relationship (index) between the difference end pixels from which the luminance difference values are calculated and the difference origin pixel.

When the processing of the feature amount extraction unit 1003 to the detection window region is thus completed, a feature amount image with a feature amount of pixel value is created.

The feature amount image of eyes as the detection target is stored in a registered feature amount image storage unit 1005.

The feature amount image of the eyes is created, for example, as described hereinafter. That is, a large number of images having a size same as the detection window and including eyes of approximately the same size are prepared, and an average image is created. The average image is an image with the pixel values of the average values corresponding pixels of a plurality of images. The same processing as executed by the feature amount extraction unit 1003 is executed for the average image, and the obtained feature amount image is stored in the registered feature amount image storage unit 1005 as the feature amount image of the eyes.

The feature amount image stored in the registered feature amount image storage unit 1005 is outputted to a correlation calculation unit 1006.

The correlation calculation unit 1006 executes correlation calculation of the feature amount image outputted from the registered feature amount image storage unit 1005 and the feature amount image outputted from the image processing unit 1000.

The correlation calculation is executed every time a new feature amount image is outputted from the image processing unit 1000 (that is, every time the detection window is scanned in the processing area clipping unit 1002), and a correlation value is calculated. The calculated correlation value is outputted to an integrated determination unit 1007.

The integrated determination unit 1007 determines whether or not eyes are included in the processing target image based on the correlation value sent from the correlation calculation unit 1006.

The determination method is not particularly limited, and a known method can be used. In the second embodiment, correlation values of a number equivalent to the number of times scanning of the detection window is executed for one processing target image in the processing area clipping unit 1002 are obtained. Then, the integrated determination unit 1007 obtains the largest of the correlation values, and when the largest one exceeds a predetermined threshold, it is determined that eyes are included in the test image. On the other hand, when the predetermined threshold is not exceeded, the integrated determination unit 1007 determines that the eyes are not included.

The above is the description of the eye detection system (FIG. 10) according to the second embodiment.

In the eye detection system according to the second embodiment, weighting parameters can be set according to the direction at the time of obtaining the luminance difference value (relative position relationship between the difference origin pixel and the difference end pixel) in the feature amount extraction unit 1003. Therefore, adjustment such as setting a larger weight to the direction that is important for eye detection processing is possible, improving detection performance.

Furthermore, because the weighting parameter can be set according to the detection target, appropriate weighting parameters for respective detection targets can be set. For example, although the example of eye detection is described in the second embodiment, when a nose is to be detected with the same system, the weighting parameters may be changed for nose detection, and the feature amount image outputted from the registered feature amount image storage unit 1005 may be changed to the one created from nose images.

The method for determining the weighting parameter value may be, for example, a method in which a person makes a determination based on experience. Or, the method may be such that the set of weighting parameters with the best recognition performance is determined by preparing database for learning, and checking detection performance by applying various sets of weighting parameters.

Third Embodiment

In the third embodiment, an example of hardware configuration that executes the image processing methods illustrated in the first and the second embodiment shall be described.

Figure 11:
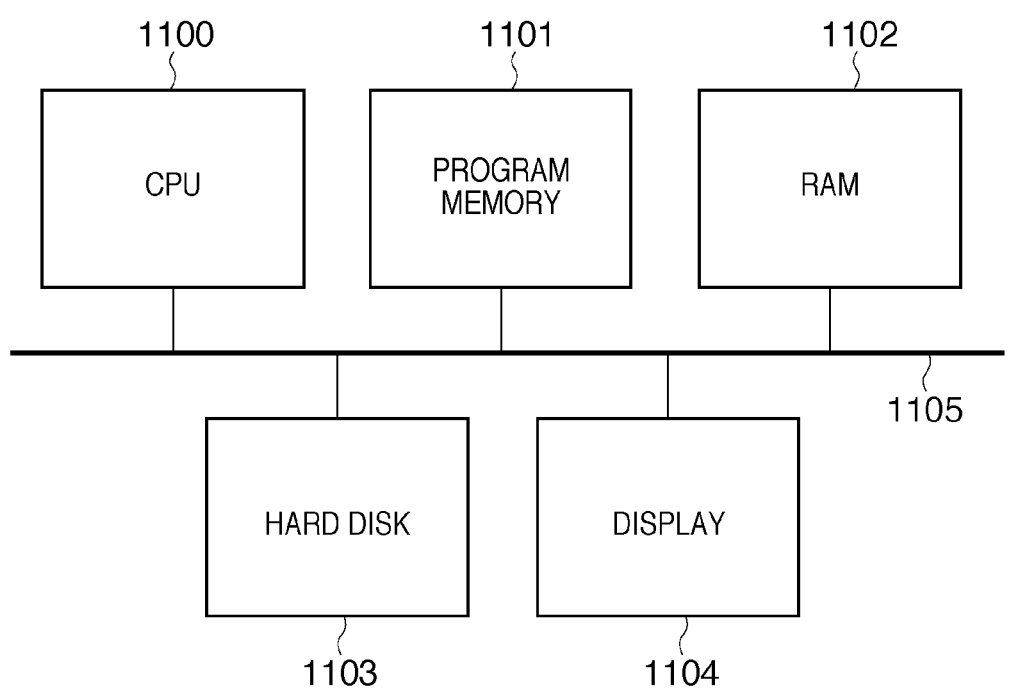
FIG. 11 is a block diagram illustrating a configuration of a preferred embodiment of hardware of the present invention.

FIG. 11 is a block diagram illustrating an exemplary hardware configuration of an information-processing device according to the third embodiment. In FIG. 11, a CPU (central processing unit) 1100 executes the image processing methods described in the first and the second embodiments using programs. A program memory 1101 stores programs to be executed by the CPU 1100. A RAM 1102 provides a memory for temporarily storing various information when the CPU 1100 executes programs. A hard disk 1103 is a storage medium for storing image files and feature amount images of the registration image. A display 1104 is a device for displaying the processing results in this embodiment to a user. Control bus/data bus 1105 connect these units described above and the CPU 1100.

The above-described image processing methods according to the first and the second embodiments can be executed using such a hardware configuration.

The above-described hardware configuration is for a case where the image processing method is entirely executed by the processing of the CPU 1100, but the processing can be partly executed by dedicated hardware. For example, the processing executed by the feature amount extraction units 103 and 1003 can be executed by dedicated hardware.

As described above, according to the above-described embodiments, the weighting values selected according to the relative position relationship of two pixels (difference origin pixel and difference end pixel) for which difference calculation is executed are changed according to the features of the detection target. Furthermore, the weighting is changed according to regions, dividing the detection target into partial regions.

Therefore, according to the above-described embodiments, weighting can be given in the direction that embodies the features of the detection target, giving effects to improve detection performance. Furthermore, because the detection target is divided into regions and the weighting is given to a direction for respective regions, detection performance further improves. Additionally, because the parameters necessary for the weighting are provided for respective regions, directions, and quantization values, a large capacity memory, which has conventionally been necessary, is no longer necessary.

Other Embodiments

Although in the first and the second embodiments, the quantization is executed according to the signs of luminance difference values during quantizing in the feature amount extraction processing, the quantization of the present invention is not limited thereto. For example, quantization can be executed by comparing the luminance difference value to a predetermined threshold (other than 0).

Also, although descriptions have been given only for the case where the quantization level is two, the number of the quantization level is clearly not limited to such a number.

Also, the positional relationship between the difference origin pixel and the difference end pixel is not limited to the one shown in the above-described embodiments. For example, FIGS. 12A to 12D shows examples of a difference origin pixel (the hatched area) and difference end pixels in a processing window. The numbers allocated in the pixels in FIGS. 12A to 12D are indexes for distinguishing the difference end pixels, and those pixels with no number allocated are pixels that are included in the processing window but not used as difference end pixels. Although only the surrounding eight pixels adjacent to the difference origin pixel are used as the difference end pixels (FIG. 12A) in the embodiments described so far, the difference end pixels in the present invention are not limited thereto.

For example, the difference end pixels may be a part of the surrounding eight pixels adjacent to the difference origin pixel, as in FIG. 12B.

Also, it is not necessary that the difference end pixels and the difference origin pixel be adjacent pixels. The difference end pixels in the proximity of the difference origin pixel will suffice. Therefore, although the size of the processing window is three by three in the illustration so far, the size of the processing window may be five by five, as in FIG. 12C. Furthermore, a part of pixels in the processing window may be used as the difference end pixels, as in FIG. 12D.

Also, because the indexes allocated for respective difference end pixels are only for distinguishing respective difference end pixels, the allocation of the indexes may be executed conveniently when applying the image processing method of the present invention.

Also, it is not necessary that the scanning step done pixel by pixel when scanning the processing region with the processing window. The number of the pixels to be skipped between the scanning steps may be selected according to the detection target or the recognition target. The number of the pixels to be skipped between the scanning steps may also be suitably selected as appropriate with respect to the processing time.

Furthermore, the number of the processing regions is not limited to the number shown in the above-described embodiment. Furthermore, the size may be different for each processing region, and the shape is not limited to a quadrangle. The processing region may overlap with one other, and one region may be included in another region.

The weighting parameters may be a table as shown in FIG. 4 in a memory, or the weighting parameters may be calculated by logical operation, when the weighting parameters can be expressed by logical operation. In this case, the logical operation is, for example, calculation using an index value and a quantization value, provided for every region in the case of the first embodiment, and for every detection target in the case of the second embodiment.

For example, when the weighting parameters are limited to a power of two, the weighting parameters can be obtained by shift operation on the quantization value (1 or 0) obtained as a result of the quantization. In this case, only how much to be shifted is stored for every difference end pixel index, and it is not necessary that the weighting parameters themselves be stored.

Also, for example, the quantization value of every difference end index can be calculated back from the calculated feature amount, when
the weighting parameters are limited to a power of two, and
the weighting parameters are unique in the same processing region when the relative position relationship between the difference origin pixel and the difference end pixels are different (weighting parameters are unique when difference end indexes are different in the same processing region). This is advantageous in that when the difference origin pixel from which the feature amount is calculated belongs to a plurality of processing regions and it is necessary that the feature amount has to be calculated for respective processing regions, up to the quantization processing, one processing will suffice.

Also, when a processing region is set to a symmetrical object (for example, a face is substantially symmetrical), the table will became small when the processing region is set according to the symmetry (as the processing region 201 and the processing region 202 in FIG. 2B). This is due to the fact that symmetrical object probably has symmetrical features. With symmetrical weighting parameters, the table size can be made small.

For example, the weighting parameter in the case when the difference end pixel is on the left of the difference origin pixel in the processing region 201, may be set equivalent to the weighting parameters in the case when the difference end pixel is on the right of the difference origin pixel in the processing region 202. Similarly, when the relative position relationship between the difference origin pixel and the difference end pixel is symmetrical in the processing region 201 and the processing region 202, the weighting parameters may be set to the same.

Also, although a luminance image is inputted in a recognition system or in a detection system in the embodiments illustrated so far, the image is not limited to the luminance image. When a user wishes recognition/detection for a color image, processing for converting a color channel to brightness may be inserted before the processing in the recognition system or in the detection system. Or, processing for conversion to a luminance image that is convenient for recognition/detection may be executed in the recognition system or in the detection system, and the image may be inputted in the image processing unit. Or, the processing illustrated in the embodiments may be executed for individual color channels, and the output results of respective channels may be integrated after the processing in the recognition system or in the detection system. The feature amount extraction unit 103 and 1003 calculate difference values of pixel values between the target pixel (difference origin pixel) and surrounding pixels (difference end pixels) in a partial image clipped as a processing region image, and determine weighting parameter using the difference values. For the pixel value, a luminance value and a color value may be used.

Although the term "weighting" is used for the parameter values stored in the weighting parameter storage unit 104, the value is actually used as a value for replacing respective quantization values. However, in the present invention, as in LBP value shown in FIG. 6B, an embodiment with a weighting parameter affecting the quantization value can certainly be used. However, in this case, the parameter value with quantization value of 0 is unnecessary.

The present invention is also achievable in embodiments such as a system, an apparatus, a method, a program, or a storage medium. Specifically, it may also be applied to a system constituted by multiple devices and may also be applied to an apparatus constituted by a single device.

Note that the case where the functionality of the above-mentioned embodiment is achieved by directly or remotely supplying a software program to a system or device and reading out and executing the supplied program code through a computer in the system or device is included in the scope of the present invention. In this case, the supplied program is a computer program that corresponds to the flowchart indicated in the drawings in the embodiment.

Accordingly, the program code itself, for realizing the functional processing of the present invention, is also included within the scope of the present invention.

In this case, object code, a program executed through an interpreter, script data supplied to an OS, or the like may be used, as long as it has the functions of the program.

Various types of computer readable storage media can be used to supply the computer program.

Using a browser of a client computer to connect to an Internet homepage and downloading the computer program of the present invention to a storage medium such as a hard disk can be given as another method for supplying the program.

Also, the functions of the present embodiment may be realized, in addition to through the execution of a loaded program using a computer, through cooperation with an OS or the like running on the computer based on instructions of the program. In this case, the OS or the like performs part or all of the actual processing, and the functions of the above-described embodiment are realized by that processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-051119, filed Feb. 29, 2008 which is hereby incorporated by reference herein in its entirety.

What is claimed is:

1. An image processing method comprising:
a clipping step of clipping respective partial images from a plurality of predetermined areas in an object image,
a first calculating step of calculating difference values of pixel values between a target pixel and surrounding pixels surrounding the target pixel in the partial image clipped in the clipping step,
a deciding step of deciding a parameter value for each of the surrounding pixels based on a predetermined area from which the partial image has been clipped in the clipping step, the difference value between the target pixel and the surrounding pixel, and a position of the surrounding pixel relative to the target pixel,
a second calculating step of calculating a feature amount corresponding to the target pixel using the parameter values for the surrounding pixels, and
a creating step of creating a feature amount image for each of the partial images by assigning the feature amount calculated with respect to each target pixel in the partial images as a pixel value of the feature amount image;
wherein in the creating step, the result of adding all the parameter values decided in the deciding step for one target pixel is set as the feature amount for the target pixel.

2. An image processing method comprising:
a clipping step of clipping a partial image from an image,
a first calculating step of calculating difference values of pixel values between a target pixel and surrounding pixels surrounding the target pixel in the partial image,
a deciding step of deciding a parameter value for each of the surrounding pixels based on types of detection targets to be detected, the difference value between the target pixel and the surrounding pixel, and a position of the surrounding pixel relative to the target pixel,
a second calculating step of calculating a feature amount corresponding to the target pixel using the parameter values for the surrounding pixels, and
a creating step of creating a feature amount image of the partial image by assigning the feature amount calculated with respect to each target pixel in the partial image as a pixel value of the feature amount image;
wherein in the creating step, the result of adding all the parameter values decided in the deciding step for one target pixel is set as the feature amount for the target pixel.

3. The method according to claim 1, further comprising:
a quantizing step of obtaining a quantization value by quantizing the difference values in a predetermined quantization level,
wherein in the deciding step, the quantization value is used for deciding the parameter values for the surrounding pixels.

4. The method according to claim 3, wherein in the quantizing step, the difference values are quantized in two quantization levels.

5. The method according to claim 1, wherein the parameter values are powers of two.

6. A pattern detection method that detects a detection target pattern from an image based on the feature amount of partial image obtained using the image processing method according to claim 2.

7. A pattern recognition method that determines which pattern that is registered in advance the object image corresponds to based on the feature amount of the partial images obtained by using the image processing method according to claim 1.

8. An image processing device comprising:
a clipping unit that clips respective partial images from a plurality of predetermined areas in an object image,
a first calculating unit that calculates difference values of pixel values between a target pixel and surrounding pixels surrounding the target pixel in the partial image clipped by the clipping unit,
a deciding unit that decides a parameter value for each of the surrounding pixels based on a predetermined area from which the partial image has been clipped by the clipping unit, the difference value between the target pixel and the surrounding pixel, and the a position of the surrounding pixel relative to the target pixel,
a second calculating hardware unit that calculates a feature amount corresponding to the target pixel using the parameter values for the surrounding pixels, and
a creating unit that creates a feature amount image for each of the partial images by assigning the feature amount calculated with respect to each target pixel in the partial images as a pixel value of the feature amount image, wherein the result of adding all the parameter values decided by the deciding unit for one target pixel is set as the feature amount for the target pixel.

9. An image processing device comprising:
a clipping unit that clips a partial image from an image,
a first calculating unit that calculates difference values of pixel values between a target pixel and surrounding pixels surrounding the target pixel in the partial image,
a deciding unit that decides a parameter value for each of the surrounding pixels based on types of detection targets to be detected, the difference value between the target pixel and the surrounding pixel, and a position of the surrounding pixel relative to the target pixel,
a second calculating hardware unit that calculates a feature amount corresponding to the target pixel using the parameter values for the surrounding pixels, and
a creating unit that creates a feature amount image of the partial image by assigning the feature amount calculated with respect to each target pixel in the partial image as a pixel value of the feature amount image, wherein the result of adding all the parameter values decided by the deciding unit for one target pixel is set as the feature amount for the target pixel.

10. A non-transitory computer-readable storage medium in which is stored a program for causing a computer to execute the image processing method according to claim 1.

11. A non-transitory computer-readable storage medium in which is stored a program for causing a computer to execute the pattern detection method according to claim 6.

12. A non-transitory computer-readable storage medium in which is stored a program for causing a computer to execute the pattern recognition method according to claim 7.

13. A non-transitory computer-readable storage medium in which is stored a program for causing a computer to execute the image processing method according to claim 2.

* * * * *